United States Patent
Kuzmanovic

(10) Patent No.: US 10,921,128 B2
(45) Date of Patent: *Feb. 16, 2021

(54) METHOD AND APPARATUS FOR MAPPING UNDERGROUND OR INTERIOR DRONE ROUTES

(71) Applicant: HERE GLOBAL B.V., Eindhoven (NL)

(72) Inventor: Ivo Kuzmanovic, Berlin (DE)

(73) Assignee: HERE Global B.V., Eindhoven (NL)

( * ) Notice: Subject to any disclaimer, the term of this patent is extended or adjusted under 35 U.S.C. 154(b) by 125 days.

This patent is subject to a terminal disclaimer.

(21) Appl. No.: 16/118,103

(22) Filed: Aug. 30, 2018

(65) Prior Publication Data

US 2020/0072613 A1    Mar. 5, 2020

(51) Int. Cl.
*G01C 21/20* (2006.01)
*G06T 17/05* (2011.01)
(Continued)

(52) U.S. Cl.
CPC .......... *G01C 21/206* (2013.01); *B64C 39/024* (2013.01); *G06F 16/29* (2019.01);
(Continued)

(58) Field of Classification Search
CPC ....... G01C 21/206; G06F 16/29; G06T 17/05; G08G 5/0034
See application file for complete search history.

(56) References Cited

U.S. PATENT DOCUMENTS 7,069,124 B1 *  6/2006  Whittaker ............ G05D 1/0225
                                                    701/28
9,505,559 B1    11/2016  Cai
(Continued)

FOREIGN PATENT DOCUMENTS

CN      106954042 A      7/2017
WO      2017096547 A1    6/2017
WO      2017192666 A1    11/2017

OTHER PUBLICATIONS

Reyes, "Aerolion Goes From Researching Drones to Solving Real-world Problems", Jan. 4, 2017, retrieved from https://e27.co/aerolion-goes-from-researching-drones-to-solving-real-world-problems-20161221/, pp. 1-6.

*Primary Examiner* — Alan D Hutchinson
*Assistant Examiner* — Andy Schneider
(74) *Attorney, Agent, or Firm* — Ditthavong & Steiner, P.C.

(57) ABSTRACT

An approach is provided for mapping underground and/or interior passageways for drone routing. The approach, for example, involves determining location data for entry points, exit points, or a combination thereof to the underground and/or interior passageways. The entry points facilitate an entry of a drone into the plurality of underground and/or interior passageways, and the exit points facilitate an exit of the drone from the plurality of passageways. The approach also involves associating the location data with a geographic database. The geographic database further includes digital map data representing the plurality of underground passageways and is used to determine a route through the underground and/or interior passageways for the drone.

18 Claims, 11 Drawing Sheets

(51) Int. Cl.
*G08G 5/00* (2006.01)
*B64C 39/02* (2006.01)
*G06F 16/29* (2019.01)

(52) U.S. Cl.
CPC ............ *G06T 17/05* (2013.01); *G08G 5/006* (2013.01); *G08G 5/0034* (2013.01); *G08G 5/0069* (2013.01); *B64C 2201/146* (2013.01)

(56) References Cited

U.S. PATENT DOCUMENTS

2016/0379488 A1* 12/2016 Fowe .................... G08G 1/052
 701/119
2018/0054490 A1* 2/2018 Wadhwa ................ H04L 63/06
2019/0392712 A1* 12/2019 Ran ........................ G08G 1/167

* cited by examiner

METHOD AND APPARATUS FOR MAPPING UNDERGROUND OR INTERIOR DRONE ROUTES

BACKGROUND

The growing use of unmanned aerial vehicles (UAVs) or aerial drones has raised concerns about increased drone traffic. This increased traffic, for instance, can lead to increased safety risks (e.g., to the public or the drones themselves) as well as noise pollution from drones flying above streets and buildings. Eventually, such concerns may lead to widespread opposition to the commercial or private use of drones. Accordingly, service providers and manufacturers face significant technical challenges to operating drones while also minimizing their impacts on the airspace above populated areas.

SOME EXAMPLE EMBODIMENTS

Therefore, there is a need for an approach for mapping underground and/or interior drone routes as an alternative to operating drones in the above ground or outside airspace.

According to one embodiment, a method comprises determining location data for a plurality of entry points, a plurality of exit points, or a combination thereof to a plurality of underground and/or interior (e.g. within a buildings or other structure) passageways. The plurality of entry points facilitates an entry of a drone into the plurality of underground and/or interior passageways and the plurality of exit points facilitates an exit of the drone from the plurality of underground and/or interior passageways. The method also comprises associating the location data with a geographic database. The geographic database further includes digital map data representing the plurality of underground passageways and is used to determine a route through the plurality of underground and/or interior passageways for the drone.

According to another embodiment, an apparatus comprises at least one processor, and at least one memory including computer program code for one or more computer programs, the at least one memory and the computer program code configured to, with the at least one processor, cause, at least in part, the apparatus to determine location data for a plurality of entry points, a plurality of exit points, or a combination thereof to a plurality of underground and/or interior passageways. The plurality of entry points facilitates an entry of a drone into the plurality of underground and/or interior passageways and the plurality of exit points facilitates an exit of the drone from the plurality of underground and/or interior passageways. The apparatus is also caused to associate the location data with a geographic database. The geographic database further includes digital map data representing the plurality of underground and/or interior passageways and is used to determine a route through the plurality of underground and/or interior passageways for the drone.

According to another embodiment, a computer-readable storage medium carries one or more sequences of one or more instructions which, when executed by one or more processors, cause, at least in part, an apparatus to determine location data for a plurality of entry points, a plurality of exit points, or a combination thereof to a plurality of underground and/or interior passageways. The plurality of entry points facilitates an entry of a drone into the plurality of underground and/or interior passageways and the plurality of exit points facilitates an exit of the drone from the plurality of underground and/or interior passageways. The apparatus is also caused to associate the location data with a geographic database. The geographic database further stores digital map data representing the plurality of underground and/or interior passageways and is used to determine a route through the plurality of underground and/or interior passageways for the drone.

According to another embodiment, an apparatus comprises means for determining location data for a plurality of entry points, a plurality of exit points, or a combination thereof to a plurality of underground and/or interior passageways. The plurality of entry points facilitates an entry of a drone into the plurality of underground and/or interior passageways and the plurality of exit points facilitates an exit of the drone from the plurality of underground and/or interior passageways. The apparatus also comprises means for associating the location data with a geographic database. The geographic database further stores digital map data representing the plurality of underground and/or interior passageways and is used to determine a route through the plurality of underground and/or interior passageways for the drone.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing underground and/or interior routing or operation of drones are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
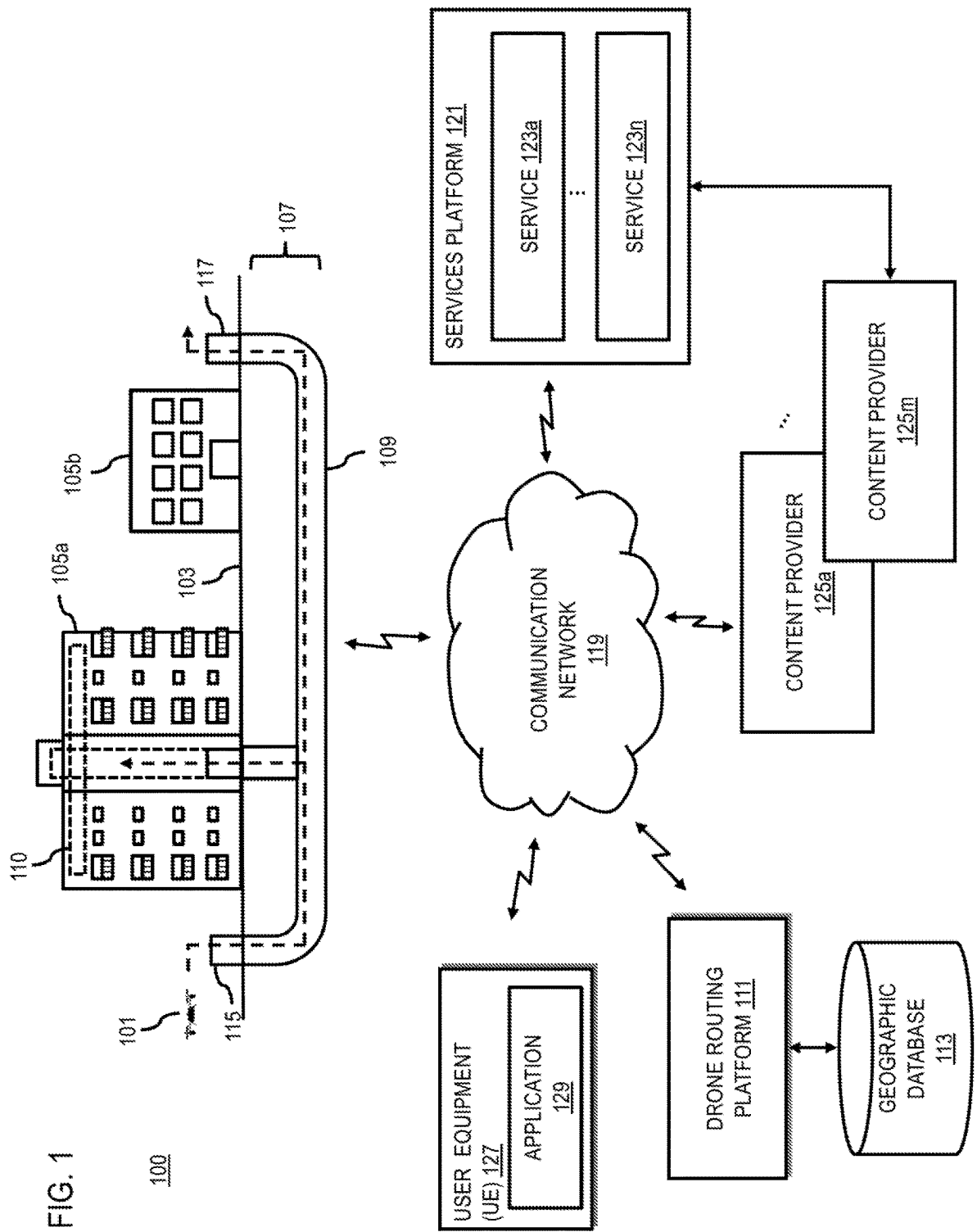
FIG. 1 is a diagram of a system capable of providing underground and/or interior routing or mapping for drones, according to one embodiment.

FIG. 1 is a diagram of a system capable of providing underground and/or interior routing or mapping for drones, according to one embodiment. As noted above, the use of drones (e.g., unmanned aerial vehicles (UAVs) and/or any other type of remotely operated vehicle) is becoming more widespread. Generally, a drone 101 operates by flying above streets 103, buildings 105a and 105b (also collectively referred to as buildings 105), and/or other public spaces where flight restrictions often apply. For example, drone flights might have to be limited during night hours to reduce noise pollution and related disturbances during typical sleep or rest times. In another example, drone flights might have to be restricted during severe weather events that could affect the drone 101's ability to operate. In addition, any crashing or malfunctioning of the drone 101 can pose serious threat to people and/or things below the drone 101's flight path. Other issues can include privacy concerns arising from operating drones 101 equipped with cameras or other sensors near buildings or people. Therefore drone manufacturers, service providers, operators, etc. face significant technical challenges to reducing the safety risks, noise pollution, privacy concerns, and/or other detrimental effects of conventionally operating a drone 101 in the above ground airspace.

To address this problem, a system 100 of FIG. 1 introduces a capability to map and/or route drones 101 through networks 107 of underground passageways 109 other interior passageways 110 (e.g., elevator shafts, ventilation ducts, crawl spaces, etc.) that are inside the buildings 105 to advantageously avoid operating in the above ground airspace including the airspace outside of buildings 105. By enabling the underground operation and/or interior operation (e.g., within buildings 105 or similar structures) of drones 101, the system 100 avoids or otherwise mitigates the safety risks, noise pollution, privacy concerns, etc. associated with conventional drone flights above ground. The system 100, for instance, can map the network of underground passageways 109 and/or interior passageways 110 in respective geographic areas that are available for drone operation (e.g., based on the physical characteristics or dimensions of the drones 101 and/or passageways 109 or 110). This map data can then be used to generate underground and/or interior drone routes or flight plans. In some embodiments, the system 100 can also combine the digital map data of the underground passageways 109 and/or interior passageways 110 with real-time data about the availability of the mapped passageways 109 and/or 110 for drone operation to determine the routes or time slots for underground/interior drone travel.

More specifically, in one embodiment, the system 100 (e.g., via a drone routing platform 111) creates digital map data (e.g., stored in a geographic database 113) of available underground passageways 109 and/or interior passageways 110 along with the entry points 115 and exit points 117 that can facilitate or allow a drone 101 to enter or exit the underground passageways 109 and/or interior passageways 110. By way of example, underground passageways 109 can include but are not limited to existing underground infrastructure such as underground tunnels (e.g., for underground transport such as subways), sewer lines, and/or other type of passageway through which a drone 101 can fit or operate. As discussed above, interior passageways 110 can include but are not limited to existing elevator shafts, ventilation ducts, crawl spaces, utility spaces, and/or other equivalent interior ducts/tunnels. In other words, the system 100 can repurpose existing underground and/or interior building/structure infrastructure for use as drone travel paths.

Figure 2A:
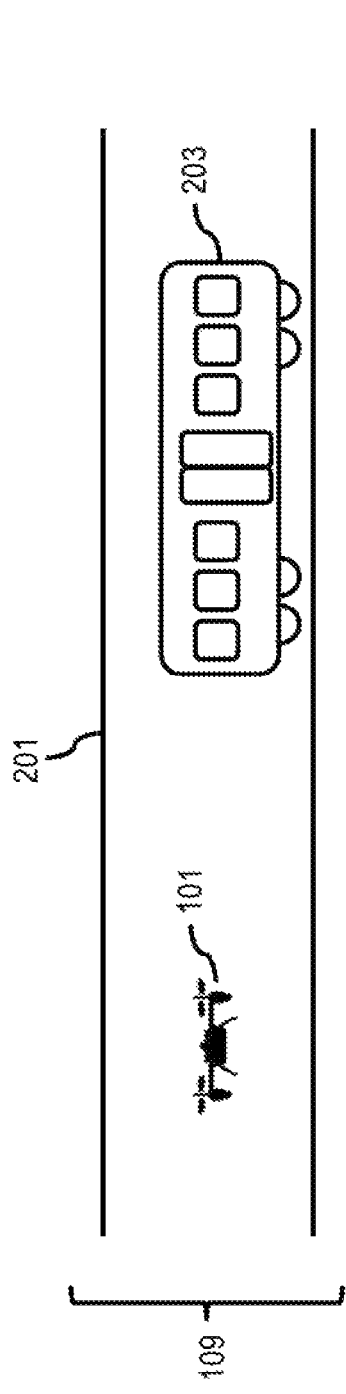
FIGS. 2A and 2B are diagrams illustrating example passageways that support drone routing, according to one embodiment.

However, this dual use can also result in potential conflicts between the original use or purpose of the underground passageway 109 and/or interior passageway 110 and their use as a drone travel path. For example, as shown in FIG. 2A, the underground passageway 109 can be an active underground public transport tunnel 201 (e.g., a subway train tunnel). Because the public transport tunnel 201 is still active, there is a potential that the tunnel 201 could be used a public transport train 203 at the same time that a drone 101 is to be routed through the tunnel 201. This can lead to a potential collision between the drone 101 and the train 203.

Figure 2B:
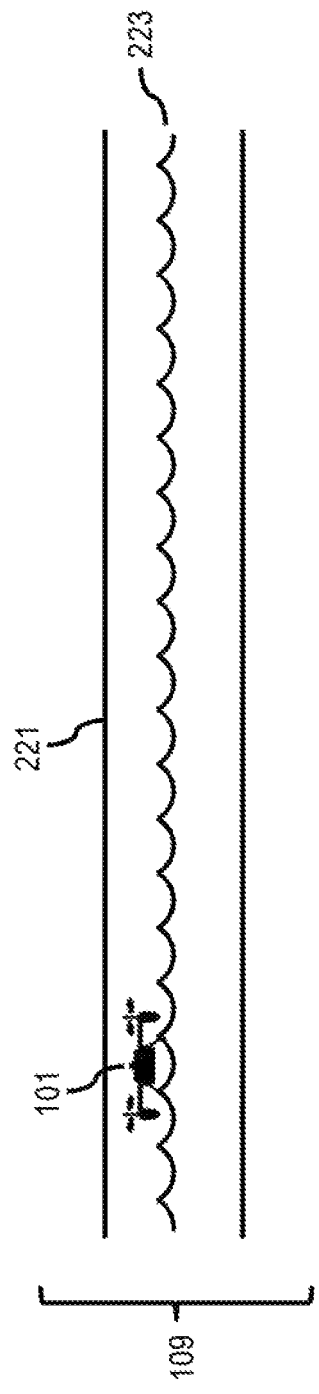

FIG. 2B illustrates an example of another type of underground passageway 109 that can be used for routing drones 101 underground. In this example, the type of underground passageway 109 is an active sewer 221 in which the water level 223 can vary. The water level 223 can vary, for instance, with the level of use of the sewer 221, weather conditions (e.g., rainy conditions can raise the water level 223 from storm runoff), and/or the like. Depending on the water level 223, a drone 101 may not have adequate space to fly or operate above the surface of the water in the sewer 221. Therefore, routing the drone 101 into a sewer 221 when the water level 223 is above a safe operating threshold could result in the drone crashing into the water if the drone is not capable of operating on or under the water. Similarly, with respect to interior passageways 110 (not shown in FIG. 2A) such as elevator shafts, elevators may periodically travel up and down, leading to potential collisions between the elevator and any drone that may be traveling in the elevator at the time.

To address this additional problem, the system 100 can collect real-time or near real-time data about the availability of the passageways 109 and/or 110 for drone travel. In one embodiment, availability of the passageways 109 and/or 110 refers to being free of any transient obstruction (e.g., trains, water, elevators, etc.) that may lead to a potential collision with or otherwise obstruct the operation of a drone 101. For example, the real-time or near-real time data can include but is not limited to the location of any trains 203 that may be operating in the tunnel 201. In one embodiment, the system 100 can store and publish this real-time data to a data layer of the digital map data of the geographic database 113. In addition or alternatively, the system 100 can use the real-time data to route the drone 101 around the real-time location of the train 203 and/or to recommend a time slot for taking a route through the tunnel 201 to avoid the train 203. For routing, the real-time data can be queried over the communication network 119 from the geographic database 113 and/or other external sources such as, but not limited, the services platform 121, any of the services 123a-123n (also collectively referred to as services 123 of the services platform 121, content providers 125a-125m (also collectively referred to as content providers 125), and/or any other equivalent source. The system 100 can then create underground and/or interior routes based on the digital map data (e.g., mapped entry points 115 and exit points 117) and/or real-time data (e.g., subway train schedules, weather data, elevator status, etc.). As discussed above, by using underground and/or interior routes, drones 101 can be operated without compromising the safety of pedestrians and vehicle traffic that drones 101 are more likely to encounter the outside airspace above ground.

Figure 3:
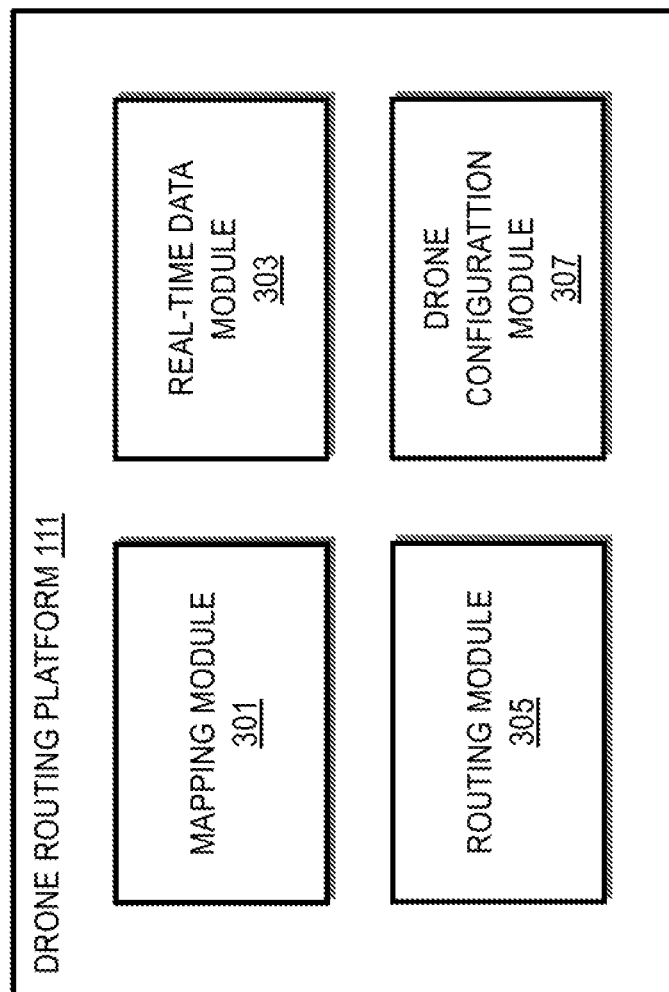
FIG. 3 is a of the components of a drone routing platform, according to one embodiment.

In one embodiment, the drone routing platform 111 includes one or more components for mapping underground and/or interior drone passageways and/or generating underground and/or interior drone routes according to the various embodiments described herein. As shown in FIG. 3, the drone routing platform 111 includes a mapping module 301, a real-time data module 303, a routing module 305, and a drone configuration module 307. The above presented modules and components of the drone routing platform 111 can be implemented in hardware, firmware, software, or a combination thereof. It is contemplated that the functions of these components may be combined or performed by other components of equivalent functionality. Though depicted as a separate entity in FIG. 1, it is contemplated that the drone routing platform 111 may be implemented as a module of any of the components of the system 100 (e.g., a component of the drone 101 and/or a client device such as user equipment (UE) 127). In another embodiment, the drone routing platform 111 and/or one or more of the modules 301-307 may be implemented as a cloud-based service, local service, native application, or combination thereof. The functions of these modules are discussed with respect to FIGS. 4-7 below.

Figure 4:
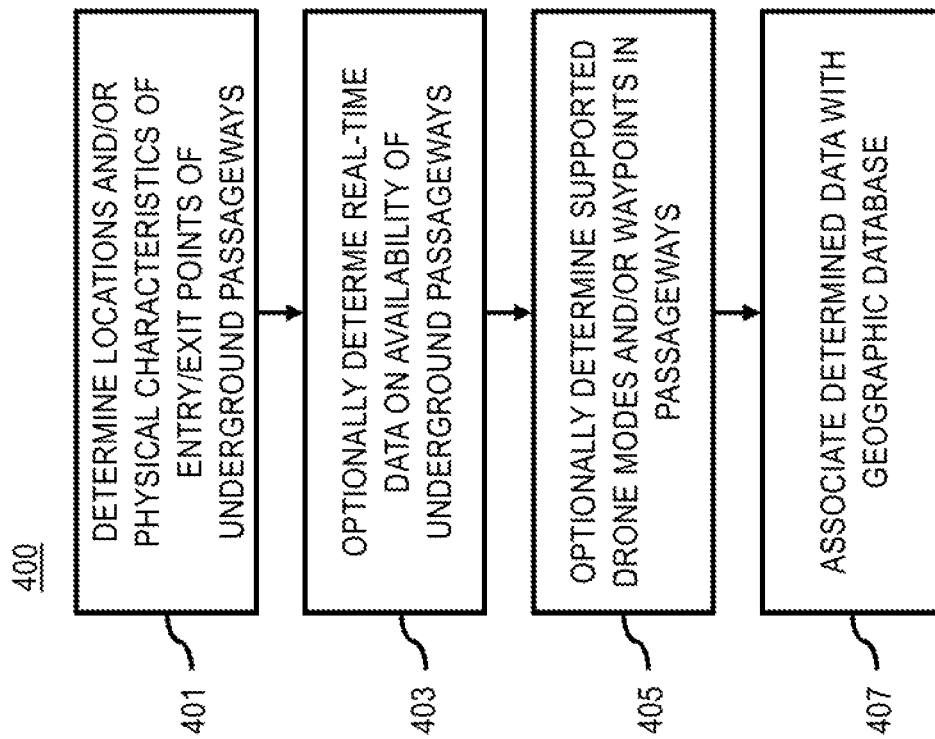
FIG. 4 is a flowchart of a process for mapping underground and/or interior drone routes, according to one embodiment.
Figure 10:
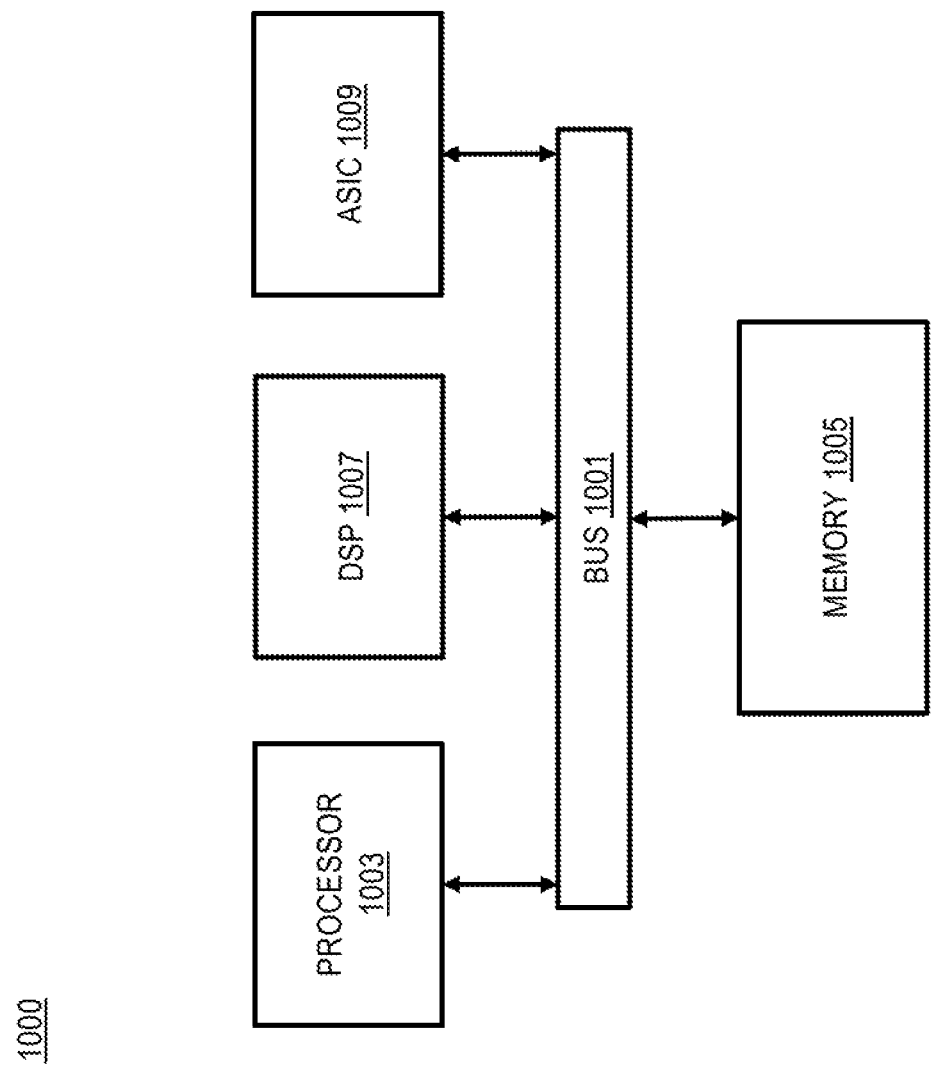
FIG. 10 is a diagram of a chip set that can be used to implement an embodiment.

FIG. 4 is a flowchart of a process for mapping underground and/or interior drone routes, according to one embodiment. In various embodiments, the drone routing platform 111 and/or any of the modules 301-307 of the drone routing platform 111 may perform one or more portions of the process 400 and may be implemented in, for instance, a chip set including a processor and a memory as shown in FIG. 10. As such, the drone routing platform 111 and/or the modules 301-307 can provide means for accomplishing various parts of the process 400, as well as means for accomplishing embodiments of other processes described herein in conjunction with other components of the system 100. Although the process 400 is illustrated and described as a sequence of steps, its contemplated that various embodiments of the process 400 may be performed in any order or combination and need not include all of the illustrated steps. More specifically, the process 400 illustrates a process for creating and storing digital map representing a network of underground passageways 109 and/or interior passageways 110 and the characteristics of the passageways 109 and/or 110 with respect to supporting underground/interior drone travel or flight.

In one embodiment (e.g., in step 401), the mapping module 301 initiates the underground and/or interior route mapping process by identifying underground passageways 109 and/or interior passageways 110 that are capable supporting drone flight or operation. For example, the mapping module 301 can determine location data (e.g., latitude, longitude, altitude, and/or other geographic coordinates) for a plurality of entry points, a plurality of exit points, or a combination thereof to the identified network or plurality of underground/interior passageways. As described above, the plurality of entry points facilitates an entry of a drone into the plurality of underground/interior passageways, and the plurality of exit points facilitates an exit of the drone from the plurality of underground/interior passageways.

It is contemplated that the mapping module 301 can use any means or data source for identifying the network of underground/interior passageways. For example, the passageways can be determined by sending out dedicated mapping vehicles or drones to identify potential underground tunnels or interior passages, and their corresponding entry and/or exit points. These mapping vehicles or drones can also be equipped with sensors (e.g., LIDAR, RADAR, cameras, etc.) to map or capture the interior of the passageways (e.g., as high-resolution mesh point cloud data, 3D models, image data, etc.). The mesh or model data can be a polygonal or other mathematical representation of the entry/exit points and passageways that are mapped to geographic coordinates to provide a geographically accurate representation of the passageways. The mesh or model data can then be included as part of the digital map data representing the entry/exit points and/or passageways in the geographic database 113. In addition or alternatively, the mapping module 301 can query or process available blueprints, diagrams, databases (e.g., municipal databases of underground infrastructure), etc. to identify potential underground/interior drone passageways.

In one embodiment, the mapping process also can include determining physical characteristic data of the plurality of entry points, the plurality of exit points, and/or the plurality of underground/interior passageways. The physical characteristic data, for instance, can include a physical size or dimensions (e.g., the dimensions of the opening of the entry/exit points, interior space of the passageways, etc.). This data can then be used determine what size drones can travel through the entry/exit points and/or passageways. The supported drone size can also take into account how much flying or operating space is required by specific drones to safely travel through the entry/exit points and passageways. Accordingly, in one embodiment, the physical characteristic data can be expressed as a supported drone size that can recorded as metadata associated with digital map data representing each respective underground/interior passageway of a mapped network.

In yet another embodiment, real-time data about the availability of the mapped passageways to support travel by the drone can also be collected and stored as a data layer or other record of the geographic database 113 (step 403). It is contemplated that the real-time data can be collected and/or stored alone or in combination with the digital map data of the passageways and corresponding entry/exit points. In one embodiment, the real-time data module 303 can query the real-time data from external databases or services providing the data (e.g., the services platform 121, services 123, content providers 125, etc.).

For example, in scenarios where the mapped underground/interior passageways include an underground tunnel supporting non-drone traffic (e.g., subway train traffic), the real-time data module 303 can query for a schedule data for the non-drone traffic through the underground tunnel to represent the real-time data. In addition or alternatively, the underground tunnels and/or interior passageways can include sensors for detecting the real-time presence of the non-drone traffic (e.g., trains, other vehicles, other drones, pedestrians, elevators, etc.) that may be present in the passageways and may potentially collide or otherwise interfere with drone travel or flight through the passageway.

In cases where the underground passageways include an underground sewer, the real-time data module 303 can monitor the water levels or other obstructions in the sewer as part of the collected real-time data. By way of example, the water levels can be monitored using water level sensors in the sewers and/or predicted from contextual data such as weather data (e.g., queried from a weather service). The weather data can then be processed to determine whether it is indicative of water level in the sewer or similar underground passageways. For example, if the weather data indicates that it has been raining heavily over an extended period of time, storm runoff or groundwater can potentially increase the water level in the sewers. In other cases, there can be scheduled releases of water (e.g., irrigation, sewer line flushing, etc.) that may be scheduled in advance. In this case, the real-time data module 303 can query schedule data for such events to predict water levels in the sewers used for drone travel.

In cases where the interior passageways include an elevator shaft, the real-time data module 303 can monitor the real-time positions of elevators in the shafts as part of the collected real-time data. In one embodiment, the elevator position data or elevator scheduling data can be transmitted to real-time data module 303 from a server associated with the building in which the elevator shaft is located. In addition or alternatively, the elevator shafts can include sensors that report the position of the elevators to the real-time data module 303. The data can also include the elevator's speed, direction of travel, and/or any other attribute that can be used to determine or predict the expected location of the elevator during a drone route through the elevator shaft.

It is noted that the examples of real-time data described above are provided by way of illustration and not as limitations. It is contemplated that the real-time data module 303 can collect real-time data from any source (e.g., databases, sensors, etc.) that can provide information on the real-time availability of a mapped underground/interior passageway to support travel by a drone. Supporting travel by a drone refers, for instance, to having a clear path through the passageway that can support drone operation without risk of potential collisions with, e.g., other vehicles, objects, people, etc. In addition, supporting drone travel can also include having enough clearance around the drone for safe operation of the drone. In other words, constricted passageways (e.g., constricted due to high water levels) may reduce the clearance around the drone below a safe operating threshold, thereby increasing potential risks to the drone so that drone travel is not supported in such passageways.

In one embodiment (e.g., step 405), the mapping module 301 can optionally determine and map other characteristics of the drone and/or passageways that can be used for underground/interior drone routing. For example, although the various embodiments are discussed with respect to aerial drones, it is contemplated that that the drone can support different modes of operation such as, but not limited to, a flying mode, a surface or ground-based mode (e.g., travel using physical contact to the ground or other surface such as a wall or ceiling), a submersible mode (e.g., travel on or below water), and/or the like. Accordingly, in one embodiment, the mapping module 301 can determine the modes supported by each respectively mapped passage and associate the supported modes of operation as metadata in the digital map data for the passageways. By way of example, the mapping module 301 can determine the supported modes based on the physical characteristic data (e.g., physical dimensions), water levels, other potential obstructions, and/or the like. For example, a narrow tunnel or passageway (e.g., tunnel less than 3 ft in diameter) may support a surface mode but not a flying mode, while a larger tunnel (e.g., tunnel greater than 3 ft in diameter) may support a flying mode and a surface mode. In another example, a large sewer line (e.g., greater than 6 ft in diameter) that has a water level at 50% can support a flying mode (e.g., by the drone flying above the surface of the water in the sewer), a surface mode (e.g., by the drone crawling on the ceiling of the sewer), and a submersible mode (e.g., by the drone diving below the water level or traveling on the surface of the water).

In yet another embodiment, there could be waypoints (e.g., ledges, side corridors, recesses, etc., that may offer locations where a drone can wait or pause during its route. Because of the dynamic nature of the conditions in the passageways (e.g., presence of non-drone traffic, water levels, etc.), the drone can be provided a route that includes such waypoints so that it can wait for real-time conditions to change (e.g., a train or elevator to pass, a water level to decrease) before proceeding to the next segment of its route when the drone executes an underground route or flight plan. Accordingly, the mapping module 301 can identify and map the locations of the waypoints in the passageways.

In step 407, the mapping module 301 associates the determined location data, physical characteristic data, waypoint data, supported modes of operation, associated real-time data, and/or other related data with the geographic database 113. In one embodiment, the data can be associated as separate data layers (e.g., digital map of the entry/exit points and passageways in one layer, real-time data in another layer, etc.) for publication to end users. In one embodiment, "associating" refers, for instance, to storing data records associated with the determined data directly into geographic database 113. In addition or alternatively, "associating" can refer to referencing or linking the geographic 113 to the determined data (e.g., an external data source or database providing the data) without storing the corresponding data values or records in the geographic database 113 itself. The geographic database 113 can also include digital map data representing the plurality of underground/interior passageways. In one embodiment, the digital map data can include 3D models or representations of the entry/exit points and/or passageways to facilitate route generation according to the embodiments described herein.

In one embodiment, the real-time data module 303 can aggregate and publish the real-time data regarding underground/interior drone passageways as a data layer of the geographic database 113. By way of example, real-time can refer to batching or aggregating the data over defined time epochs (e.g., every 15 minutes) with the most recent time epoch published as the real-time data and updated as each new time epoch passes.

Figure 5:
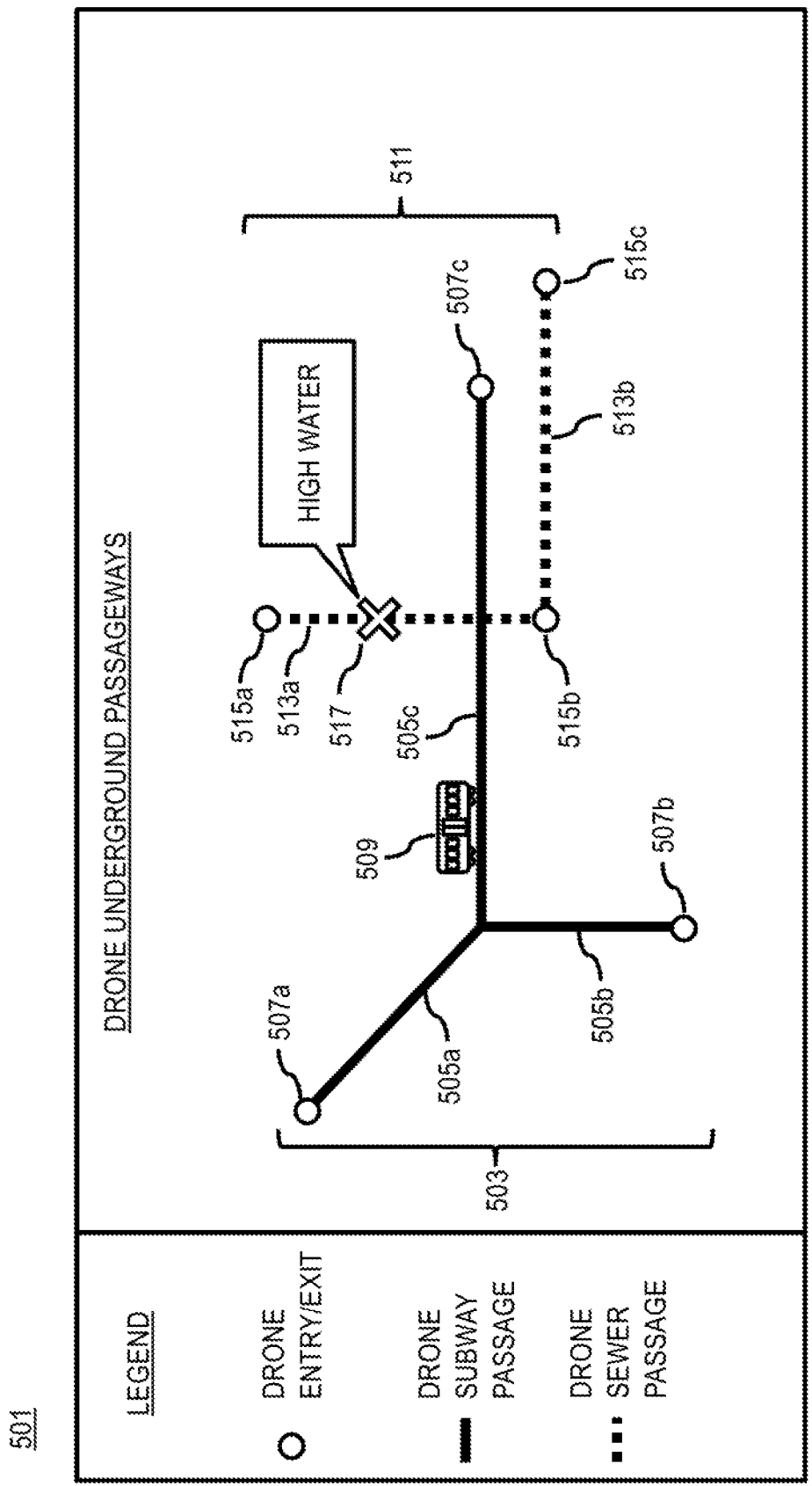
FIG. 5 is a diagram of an example mapping user interface for presenting map data for underground drone routes, according to one embodiment.

In one embodiment, the digital map of the underground drone routes can be used to provide data for presenting a mapping user interface (UI) 501 as shown in FIG. 5. As shown, the mapping UI 501 depicts a map of the drone underground passageways represented in the digital map of the geographic database 113 for a geographic area of interest. The UI 501 depicts a first network 503 including passageways 505a-505c that are subway train tunnels with mapped drone entry/exit points 507a-507c indicated by a circle. The UI also presents real-time information on the location of a train 509 detected in the passageway 505c (e.g., via train schedule data a published in the real-time data layer of the geographic database 113). The UI 501 also depicts a second network 511 including passageways 513a and 513b that are sewer lines with mapped drone entry/exit points 515a-515c. In this example, the drone routing platform 111 has determined that real-time data indicates that the current water level in the sewer 513a is above a threshold level for safe operation of a drone and has marked the sewer 513a with a "X" symbol 517 to indicate that there is "HIGH WATER".

Figure 6:
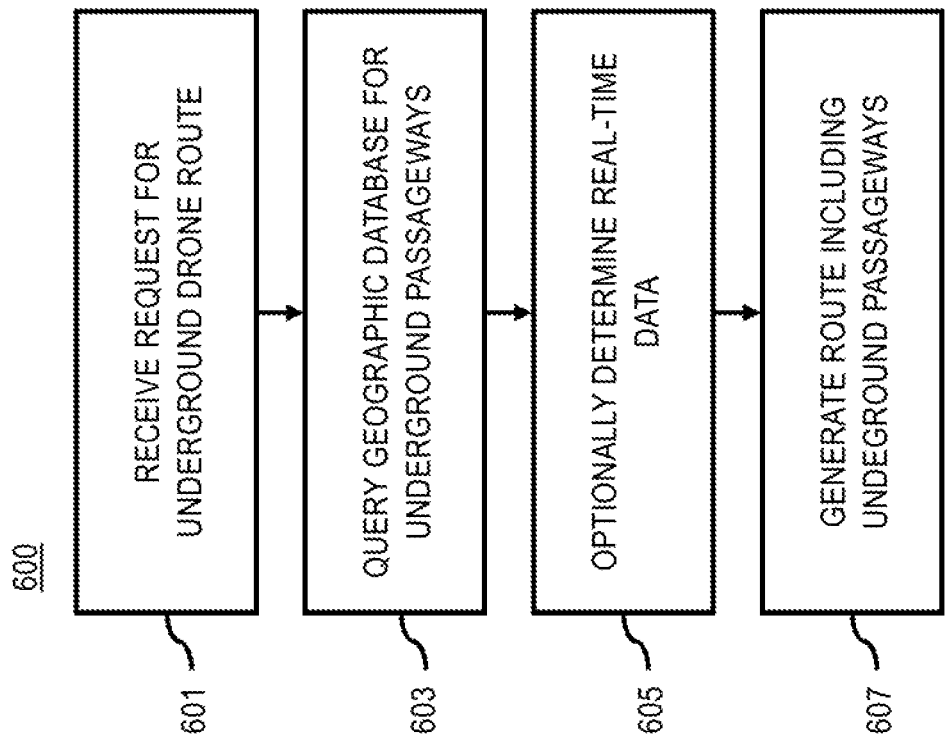
FIG. 6 is a flowchart of a process for generating underground and/or interior drone routes, according to one embodiment.

In another embodiment, the digital map of the underground/interior drone routes can be used to create underground and/or interior drone routes. FIG. 6 is a flowchart of a process for generating underground and/or interior drone routes, according to one embodiment. In various embodiments, the drone routing platform 111 and/or any of the modules 301-307 of the drone routing platform 111 may perform one or more portions of the process 600 and may be implemented in, for instance, a chip set including a processor and a memory as shown in FIG. 10. As such, the drone routing platform 111 and/or the modules 301-307 can provide means for accomplishing various parts of the process 600, as well as means for accomplishing embodiments of other processes described herein in conjunction with other components of the system 100. Although the process 600 is illustrated and described as a sequence of steps, its contemplated that various embodiments of the process 600 may be performed in any order or combination and need not include all of the illustrated steps.

In step 601, the routing module 305 receives a request to generate an underground and/or interior route for a drone. The request, for instance, can identify at least a destination and/or origin for computing the route. The destination can be an above ground location that is reachable by traveling through a network of underground and/or interior passageways. Accordingly, the request can include above ground, underground, and/or interior portions. The above ground portion may include the route from the beginning or end of the underground/interior portions when the underground/interior passageways cannot directly reach the desired above ground destination.

In step 603, the routing module 305 queries the digital map data representing a network of underground/interior passageways (e.g., from the geographic database 113) for at least one underground/interior passageway of the network to reach a destination of the drone, wherein the digital map data stores location data for a plurality of entry points, a plurality of exit points, or a combination thereof to the network of underground/interior passageways.

In step 605, the routing module 305 can additionally or alternatively determine real-time data regarding an availability of the at least one underground/interior passageway to support travel by the drone. For example, for potential passageways that are tunnels/passageways for non-drone traffic (e.g., subway or public transport trains for underground tunnels, elevators in elevator shafts, etc.), the routing module 305 can query for public transport/elevator schedules and/or real-time or near real-time positions of underground transport or other non-drone entities (e.g., elevators) using the passageways. The routing module 305 can determine the data from the real-time data layer published in the geographic database as described above, and/or query the data directly from public transport authorities or other providers of the data (e.g., services platform 121, services 123, and/or content providers 125). For sewers, the routing module 305 can determine real-time data on the water levels in the sewers that are candidate routes in order to find routes with the lowest water levels or water levels that can support drone operation. In summary, the real-time data can be determined from any combination of sensor data, weather data, schedule data, etc. available from the geographic database 113, third-party data sources, and/or equivalent.

In step 607, the routing module 305 generates a route to the destination via the at least one underground/interior passageway based on the location data and/or the real-time data. For example, the route can direct the drone the appropriate entry/exit points of the network of underground/interior passageways that can reach the destination according to specified preferences (e.g., shortest time, shortest distance, most energy efficient, prefer transport tunnels, prefer sewers, prefer interior passageways, etc.). With respect to an aerial drone, the drone route can include a flight path or route constructed, at least in part, from variable flight variable including but not limited to approach angle, height, distance the walls or sides of the passageways or entry/exit points, locations where the drone rises or descends, etc. When considering real-time data, the route can also be generated to recommend or specify time slots to execute the route to reduce or avoid potential collisions or other obstacles (e.g., trains, elevators, water, etc.) in the passageways. For example, in non-drone traffic tunnels, the routing module 305 can determine a time slot for drone operation or travel so that the non-drone traffic is the tunnels or passageways can be avoided based on the schedule data for the non-drone or sensed/reported real-time locations of the non-drone traffic. Alternatively, the route can be generated to avoid tunnels with detected non-drone traffic (e.g., train traffic, elevator traffic, etc.) when travel at another time slot is not possible or not desired. Similarly, with respect to sewers, the route can be generated so that drone travel occurs when the water levels are compatible with drone operation in the passageway (e.g., the water levels are low enough to provide clearance for drone flight). For example, the route is generated to avoid traveling in the sewer based on determining that the water level is above or is expected to be above a threshold value. If an appropriate time slot through a candidate sewer line is not available or desired, the routing module 305 can route the drone through other sewer lines instead.

In one embodiment, the routing module 305 can determine at least one waypoint in or near the at least one underground passageway. The at least waypoint provides a location for the drone to wait for the availability of the at least one underground/interior passage based on the real-time data. For example, the availability is limited only for later sections of the route, the routing module 305 can create a route that starts immediately but then directs the drone to wait or pause at certain waypoints to allow the upcoming passageway to become available for drone travel (e.g., wait for a train/elevator to pass, wait for the water level to drop, etc.). The route can specify the time period for the drone to wait based on schedule data, sensor data, predicted weather, etc.

In an embodiment in which the drone requesting a route is capable of different modes of operation (e.g., flying mode, surface or ground-based mode, submersible mode, etc.), the routing module 305 can select an underground/interior route including passageways that support the same modes of operation as the requesting drone by querying for passageways with digital map metadata matching the drone's mode of operation. For example, a drone supporting a ground-based mode can be routed through passageways supporting a surface or ground-based mode of operation. In cases where the drone supports multiple modes of operation and can dynamically switch between the different modes, the routing module 305 can generate multi-modal route for the drone. The multi-modal route, for instance, can direct the drone to use a first mode (e.g., flying mode) for a first segment, and then a second mode (e.g., submersible mode) for a second segment. For example, when traveling through a partially flooded sewer line, the drone can be routed or instructed to fly in the segments of the sewer with low or no water, and then switch to a submersible mode with reaching the flooded section. Accordingly, the routing module 305 can generate the route to include data for initiating the at least one mode of operation by the drone for a corresponding portion of the least one underground passageway. The data, for instance, can be an instruction or trigger for switching modes of operation. In another example, when routing through the interior of a building, a drone can be instructed to fly through an elevator shaft and then travel on the ground through a public hallway connecting to another elevator shaft or ventilation duct before resuming flight in the other shaft or duct. In this way, the drone can advantageously avoid flying in public hallway where it may be more likely to encounter unexpected objects or people, thereby reducing safety risks.

After generating the route, the routing module 305 can interact with the drone configuration module 307 to provide the route to the drone. For example, the generated route or multiple candidate routes can be transmitted to the drone or a device of the drone operator (e.g., UE 127 via an application 129 for controlling the drone 101) for selection or execution by the drone.

Figure 7:
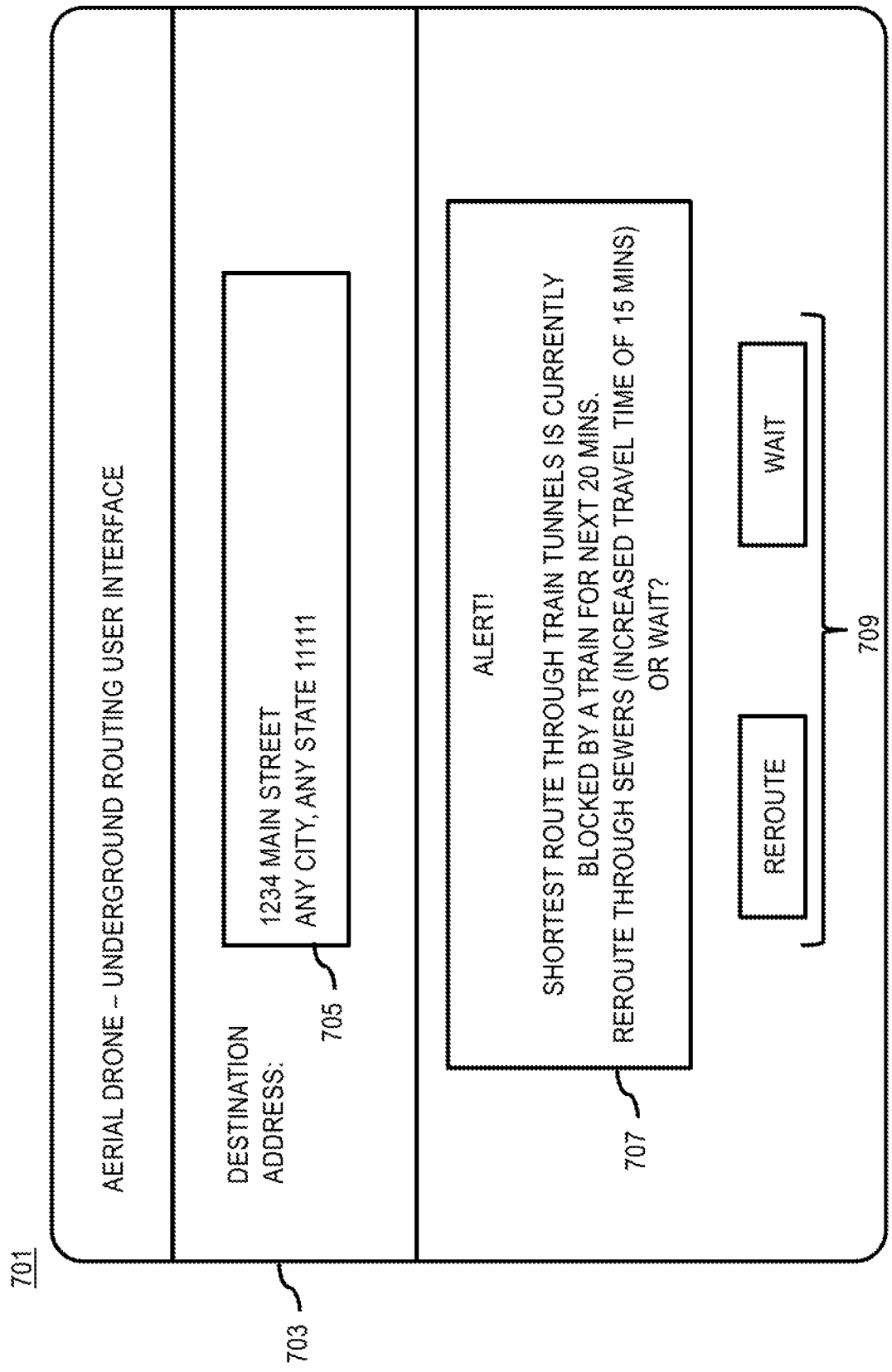
FIG. 7 is a diagram illustrating an example user interface for requesting an underground route for a drone, according to one embodiment.

FIG. 7 is a diagram illustrating an example user interface for requesting an underground route for a drone, according to one embodiment. As shown, a UI 701 provides a user interface element 703 or window for entering a destination location 705 for a drone (e.g., an aerial drone or UAV). On inputting an address 705, the drone routing platform 111 generates an underground route using the digital map date of underground passageways and real-time passageway data (e.g., as stored in the geographic database 113). In this example, the drone routing platform 111 calculates that the shortest route from the present location of the drone to the destination address is through the underground train tunnels. However, the real-time data collected by the drone routing platform 111 indicates that the train tunnel in the shortest route is currently being used by a train and will be blocked for the next 20 minutes. Based on this, the drone routing platform 111 presents an alert message 707 providing an alternative route through the sewer lines. The drone routing platform 111 calculates that the alternative route through the sewers would increase the estimated time of arrival by 15 mins and presents the drone operator with options 709 to accept the rerouting through the sewers or to wait until the train clears the shortest route.

Returning to FIG. 1, as shown, the system 100 comprises a drone 101 equipped with a variety of sensors that is capable operating in underground/interior passageways. In one embodiment, the drone 101 can fly or otherwise operate autonomously or under direct control via the UE 127 that may include or be associated with one or more software applications 129 supporting underground and/or interior drone routing according to the embodiments described herein. As previously discussed, the system 100 further includes drone routing platform 111 coupled to the geographic database 113, wherein the drone routing platform 111 is performs the functions associated with underground and/or interior drone mapping and routing as discussed with respect to the various embodiments described herein. In one embodiment, the drone 101, drone routing platform 111, UE 127, and other components of the system 100 have connectivity to each other via the communication network 119.

In one embodiment, the drone 101 is a UAV capable of operating autonomously or via a remote pilot using UE 127 to fly the drone 101 or configure a flight path or route for the drone 101. In one embodiment, the drone 101 is configured to travel using one or more modes of operation through underground and/or interior passageways. The drone 101 many include any number of sensors including cameras, recording devices, communication devices, etc. By way example, the sensors may include, but are not limited to, a global positioning system (GPS) sensor for gathering location data based on signals from a positioning satellite, Light Detection And Ranging (LIDAR) for gathering distance data and/or generating depth maps, a network detection sensor for detecting wireless signals or receivers for different short-range communications (e.g., Bluetooth®, Wireless Fidelity (Wi-Fi), Li-Fi, Near Field Communication (NFC), etc.), temporal information sensors, a camera/imaging sensor for gathering image data, and the like. The drone 101 may also include recording devices for recording, storing, and/or streaming sensor and/or other telemetry data to the UE 127 and/or the drone routing platform 111 for mapping or routing through underground passageways.

In one embodiment, the drone 101 is capable of being configured with and executing at least one underground and/or interior route (e.g., an underground and/or interior flight path) according to the embodiments described herein. The drone can also be configured avoid objects (e.g., trains, pedestrians, elevators, etc.) and/or obstructions (e.g., high water levels) in the underground/interior passageways. In addition, the drone 101 can be configured to observe restricted paths or routes. For example, the restricted paths may be based on governmental regulations that govern/restrict the path that the drone 101 may fly (e.g., Federal Aviation Administration (FAA) policies regarding required distances between objects). In one embodiment, the system 100 may also take into account one or more pertinent environmental or weather conditions (e.g., rain, water levels, sheer winds, etc. in and around underground passageways and their entry/exit points) in determining an underground/interior route or flight path.

In one embodiment, the drone 101 may determine contextual information such as wind and weather conditions in route that may affect the drone 101's ability to follow the specified underground/interior path or the above ground/outside route to the underground/interior path (e.g., using one or more onboard sensors) and then relay this information in substantially real-time to the system 100. In one embodiment, the drone 101 may request one or more modifications of the flight path based, at least in part, on the determination of the contextual information or a change in the real-time conditions of the passageways (e.g., dynamic features such as changed public transport schedules, or unexpected water levels). In one embodiment, the system 100 creates a data object to represent the underground/interior route and may automatically modify the route data object based on receipt of the contextual information from the drone 101 or another source and then transmit the new route object to the drone 101 for execution. In one embodiment, the drone 101 can determine or access the new route data object and/or determine or access just the relevant portions and adjust its current path accordingly. For example, in narrow passageways or passageways with rising water levels, the system 100 may condense the width of the drone 101's flight path to better ensure that the UAV will avoid the sides of the passageway or the water therein.

By way of example, a UE 127 is any type of dedicated UAV/drone control unit, mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that a UE 127 can support any type of interface to the user (such as "wearable" circuitry, etc.). In one embodiment, a UE 127 may support any type of interface for piloting or routing the drone 101. In addition, a UE 127 may facilitate various input means for receiving and generating information, including, but not restricted to, a touch screen capability, a keyboard and keypad data entry, a voice-based input mechanism, and the like. Any known and future implementations of a UE 127 may also be applicable.

By way of example, the UE 127 and/or the drone 101 may execute applications 129, which may include various applications such as an underground/interior routing application, a location-based service application, a navigation application, a content provisioning application, a camera/imaging application, a media player application, an e-commerce application, a social networking application, and/or the like. In one embodiment, the applications 129 may include one or more feature recognition applications used for identifying or mapping privacy-sensitive features or routes according to the embodiments described herein. In one embodiment, the application 129 may act as a client for the drone routing platform 111 and perform one or more functions of the drone routing platform 111. In one embodiment, an application 129 may be considered as a Graphical User Interface (GUI) that can enable a user to configure an underground route or flight path for execution by drone 101 according to the embodiments described herein.

In one embodiment, the communication network 119 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

In one embodiment, the drone routing platform 111 can interact with the services platform 121 to receive data (e.g., underground digital map data, passageway model data, real-time data about the availability of underground passageways, etc.) for providing underground and/or interior routing or operation of the drone 101. By way of example, the services platform 121 may include one or more services 123 for providing content (e.g., 3D object models of passageways, LIDAR data, underground passageway cartography data, 2D/3D imagery, etc.), provisioning services, application services, storage services, mapping services, navigation services, contextual information determination services, location-based services, information-based services (e.g., weather), etc. By way of example, the services 123 may provide or store non-drone traffic schedule data (e.g., train/subway schedules, elevator schedules, etc.), weather data, water level schedules, and/or other data used by the embodiments describe herein. In one embodiment, the services platform 121 may interact with the drone 101, UE 127, and/or drone routing platform 111 to supplement or aid in processing of the underground/interior passageway mapping and/or routing information.

By way of example, the drone 101, UE 127, drone routing platform 111, and the services platform 121 communicate with each other and other components of the system 100 using well known, new or still developing protocols. In this context, a protocol includes a set of rules defining how the network nodes within the system 100 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 8:
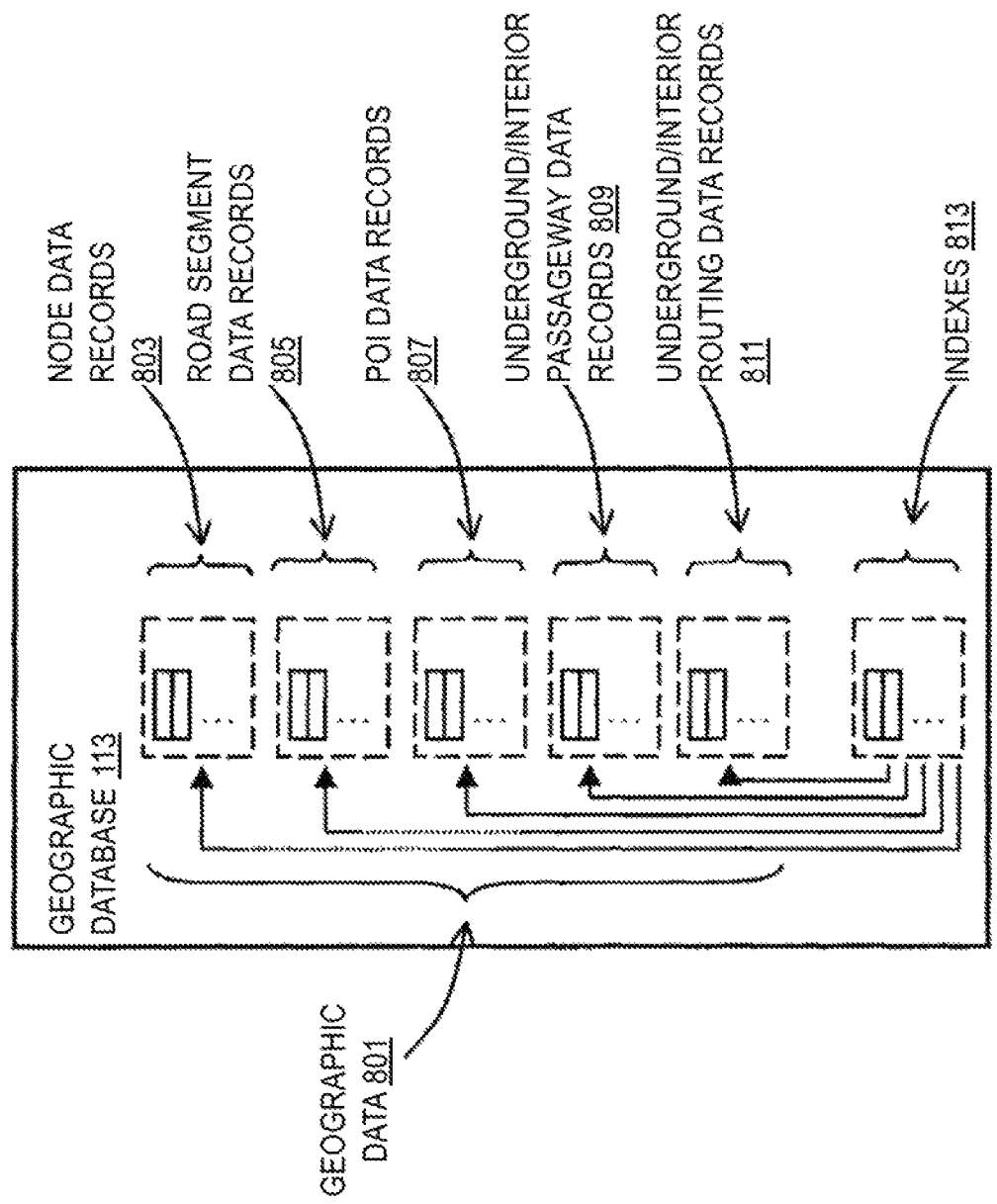
FIG. 8 is a diagram of a geographic database capable of storing map data for underground/interior drone routing, according to one embodiment.

FIG. 8 is a diagram of a geographic database 113 capable of storing map data for underground and/or interior drone mapping and routing, according to one embodiment. In one embodiment, the geographic database 113 includes geographic data 801 used for (or configured to be compiled to be used for) mapping and/or navigation-related services, such as for routing drones to create a 3D flightpath or route. In one embodiment, the 3D flightpath or route is executed a drone 101 for package delivery to a target delivery location (e.g., a balcony or other location in a target building). For example, the geographic database 801 stores model data (e.g., 3D object models of underground passageways and their entry/exit points) among other related data.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions, models, routes, etc. Accordingly, the terms polygons and polygon extrusions/models as used herein can be used interchangeably.

In one embodiment, the following terminology applies to the representation of geographic features in the geographic database 113.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 113 follows certain conventions. For example, links do not cross themselves and do not cross each other except at a node. Also, there are no duplicated shape points, nodes, or links. Two links that connect each other have a common node. In the geographic database 113, overlapping geographic features are represented by overlapping polygons. When polygons overlap, the boundary of one polygon crosses the boundary of the other polygon. In the geographic database 113, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic data 801 of the database 113 includes node data records 803, road segment or link data records 805, POI data records 807, underground/interior passageway data records 809, underground/interior routing data records 811, and indexes 813, for example. More, fewer or different data records can be provided. In one embodiment, additional data records (not shown) can include cartographic ("carto") data records, routing data, and maneuver data. In one embodiment, the indexes 813 may improve the speed of data retrieval operations in the geographic database 113. In one embodiment, the indexes 813 may be used to quickly locate data without having to search every row in the geographic database 113 every time it is accessed. For example, in one embodiment, the indexes 813 can be a spatial index of the polygon points associated with stored feature polygons.

In exemplary embodiments, the road segment data records 805 are links or segments representing roads, streets, or paths, as can be used in the calculated route or recorded route information for determination of one or more personalized routes. The node data records 803 are end points corresponding to the respective links or segments of the road segment data records 805. The road link data records 805 and the node data records 803 represent a road network, such as used by vehicles, cars, and/or other entities. In addition, the geographic database 113 can contain path segment and node data records or other data that represent 3D paths around 3D map features (e.g., terrain features, buildings, other structures, etc.) that occur above street level, such as when routing or representing flightpaths of aerial vehicles (e.g., drones 101), for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 113 can include data about the POIs and their respective locations in the POI data records 807. The geographic database 113 can also include data about places, such as cities, towns, or other communities, and other geographic features, such as bodies of water, mountain ranges, etc. Such place or feature data can be part of the POI data records 807 or can be associated with POIs or POI data records 807 (such as a data point used for displaying or representing a position of a city).

In one embodiment, the geographic database 113 can also include underground/interior passageway data records 809 for the digital map data representing mapped the network of mapped underground/interior passageways along with the entry/exit points, physical characteristic data, supported drone modes of operation, waypoints for drones to wait, and/or any other related data as described in the embodiments above. The underground/interior digital map can also store model data (e.g., 3D object models) of the underground/interior passageways and their entry/exit points for facilitate creating a drone flight path or route through the passageways. In one embodiment, the 3D model data of the underground/interior passageways and entry/exit points can be created from LiDAR, aerial/satellite-based 3D sensor data, and/or other 3D sensor data collected for a geographic area. For example, mobile mapping vehicles equipped with LiDAR and/or equivalent sensors can provide 3D model data. Passageway map data can also be obtained with portable or smaller mapping devices/vehicles used to access the passageways for scanning or mapping. In one embodiment, the underground/interior passageway data records 809 can be associated with one or more of the node records 803, road segment records 805, and/or POI data records 807 so that the mapped passageways can inherit characteristics, properties, metadata, etc. of the associated records (e.g., location, address, POI type, etc.). In one embodiment, the system 100 (e.g., via the drone routing platform 111 can use the additional characteristics, properties, metadata, etc. to generate underground and/or interior drone routes. In one embodiment, the underground/interior passage data records 809 can include a data layer for storing real-time data on the availability of the passageways to support drone travel according to the embodiments described herein.

In one embodiment, the system 100 is capable of generating underground and/or interior drone routes using the digital map data and/or real-time data stored in the geographic database 113. The resulting underground routing and guidance can be stored in the underground/interior routing data records 811. By way of example, the routes stored in the data records 811 can be created for individual 3D flightpaths or routes as they are requested by drones or their operators. In this way, previously generated underground and/or interior routes can be reused for future drone travel through the underground passageways to the same target location.

In one embodiment, the underground and/or interior routes stored in the underground/interior routing data records 811 can be specific to characteristics of the drone 101 (e.g., drone type, size, supported modes of operation) and/or other characteristics of the passageways or route. In addition, the underground and/or interior routes generated according to the embodiments described herein can be based on contextual parameters (e.g., time-of-day, day-of-week, season, etc.).

In one embodiment, the geographic database 113 can be maintained by the services platform 121 and/or any of the services 123 of the services platform 121 (e.g., a map developer). The map developer can collect geographic data to generate and enhance the geographic database 113. There can be different ways used by the map developer to collect data. These ways can include obtaining data from other sources, such as municipalities or respective geographic authorities. In addition, the map developer can employ aerial drones (e.g., using the embodiments of the privacy-routing process described herein) or field vehicles (e.g., mapping drones or vehicles equipped with mapping sensor arrays, e.g., LiDAR) to travel along roads and/or within buildings/structures throughout the geographic region to observe features and/or record information about them, for example. Also, remote sensing, such as aerial or satellite photography or other sensor data, can be used.

The geographic database 113 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation capable device or vehicle, such as by the drone 101, for example. The navigation-related functions can correspond to 3D flightpath or navigation, 3D route planning for package delivery, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing underground and/or interior drone mapping and routing may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
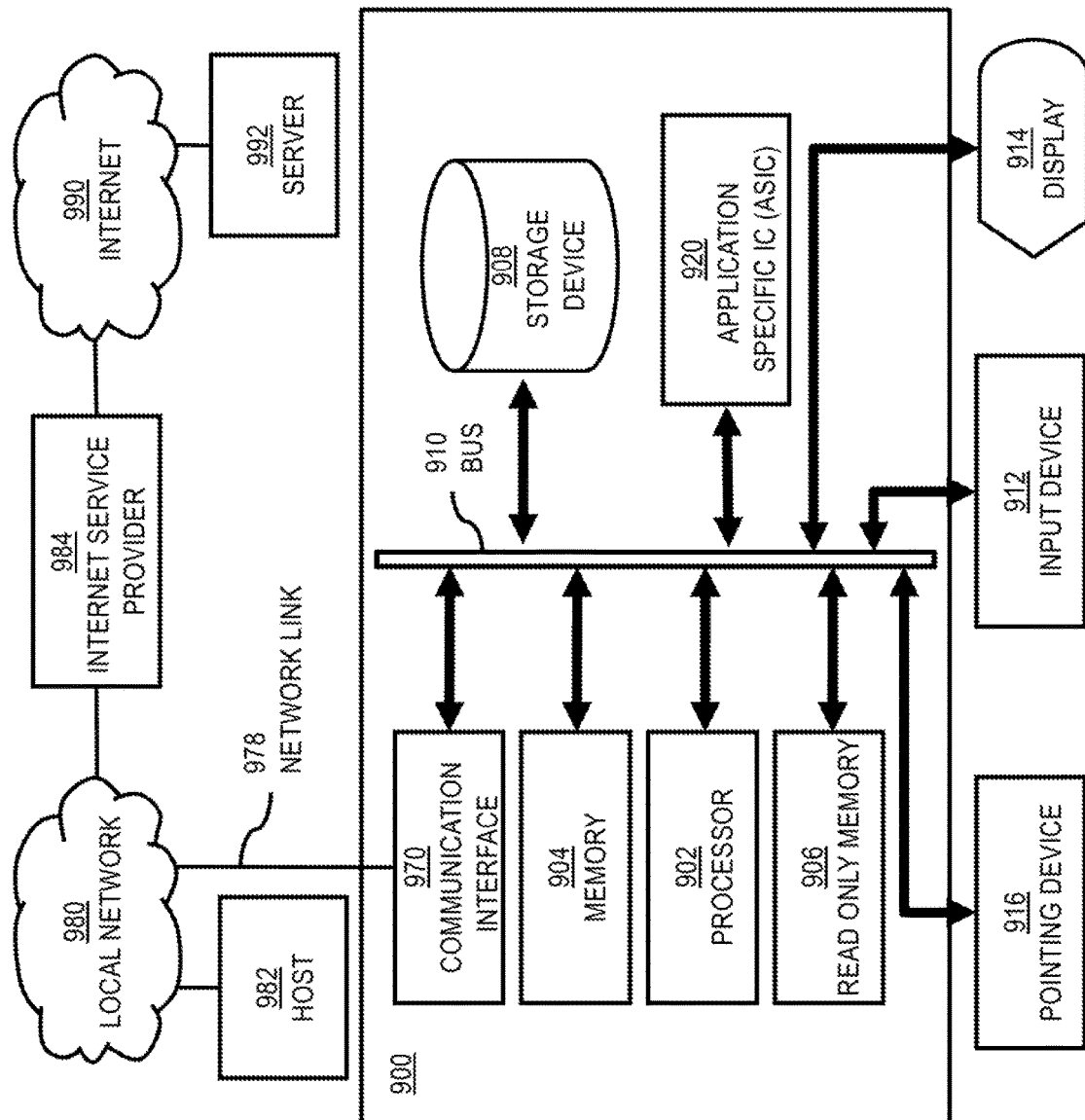
FIG. 9 is a diagram of hardware that can be used to implement an embodiment.

FIG. 9 illustrates a computer system 900 upon which an embodiment of the invention may be implemented. Computer system 900 is programmed (e.g., via computer program code or instructions) to provide underground and/or interior drone mapping and routing as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 910 includes one or more parallel conductors of information so that information is transferred quickly among devices coupled to the bus 910. One or more processors 902 for processing information are coupled with the bus 910.

A processor 902 performs a set of operations on information as specified by computer program code related to providing underground and/or interior drone mapping and routing. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or other dynamic storage device, stores information including processor instructions for providing underground and/or interior drone mapping and routing. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for providing underground and/or interior drone mapping and routing, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT) or a liquid crystal display (LCD), or plasma screen or printer for presenting text or images, and a pointing device 916, such as a mouse or a trackball or cursor direction keys, or motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of application specific ICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 119 for providing underground and/or interior drone mapping and routing.

The term computer-readable medium is used herein to refer to any medium that participates in providing information to processor 902, including instructions for execution. Such a medium may take many forms, including, but not limited to, non-volatile media, volatile media and transmission media. Non-volatile media include, for example, optical or magnetic disks, such as storage device 908. Volatile media include, for example, dynamic memory 904. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 10 illustrates a chip set 1000 upon which an embodiment of the invention may be implemented. Chip set 1000 is programmed to provide underground and/or interior drone mapping and routing as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to provide underground and/or interior drone mapping and routing. The memory 1005 also stores the data associated with or generated by the execution of the inventive steps.

Figure 11:
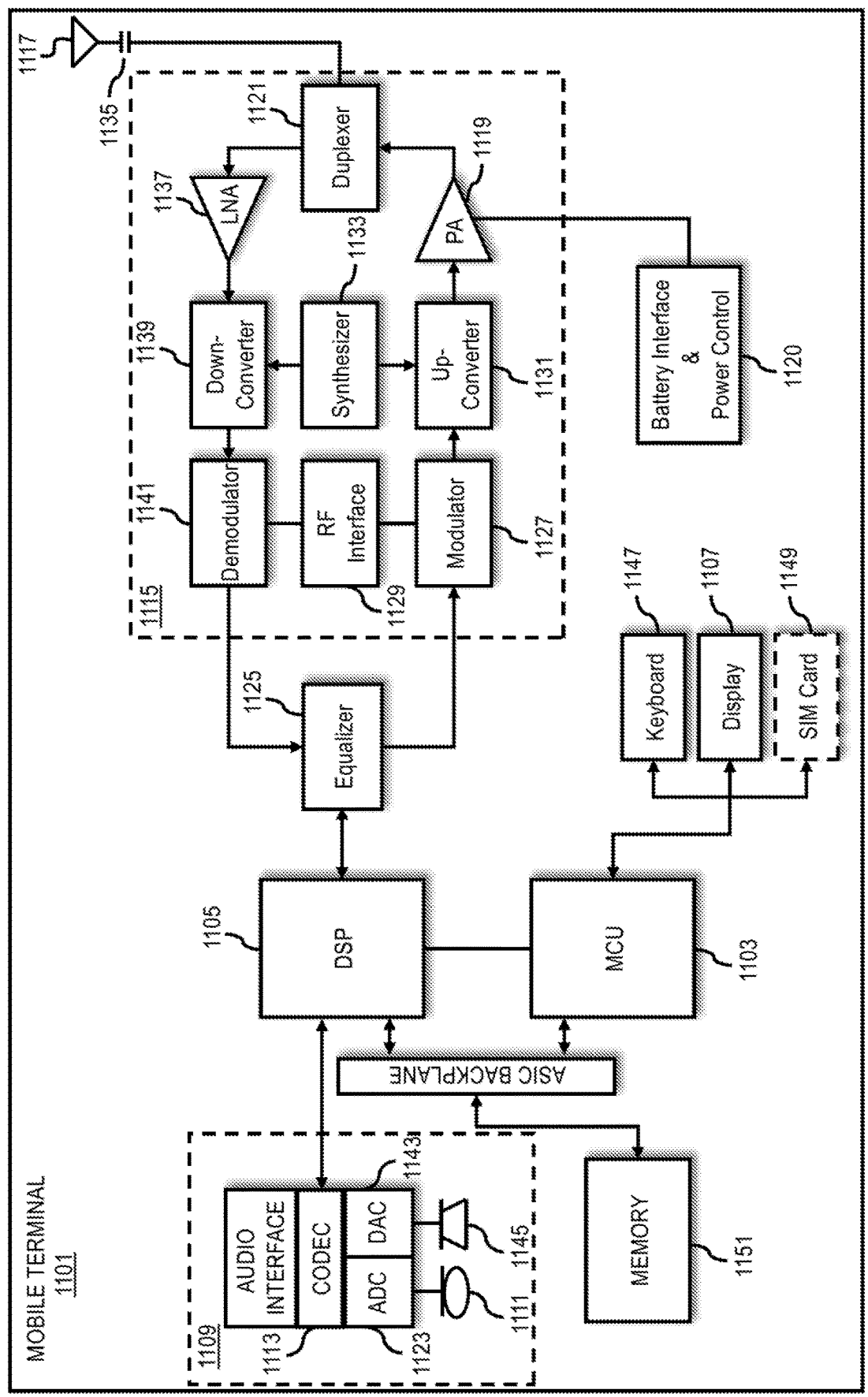
FIG. 11 is a diagram of a mobile terminal (e.g., handset or drone or part thereof) that can be used to implement an embodiment.

FIG. 11 is a diagram of exemplary components of a mobile terminal 1101 (e.g., client device such as the UE 127 or drone or part thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile station functions that offer automatic contact matching. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile station 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103—which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile station 1101 to provide underground and/or interior drone mapping and routing. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the station. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile station 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1151 may be, but not limited to, a single memory, CD, DVD, ROM, RAM, EEPROM, optical storage, or any other non-volatile or non-transitory storage medium capable of storing digital data.

An optionally incorporated SIM card 1149 carries, for instance, important information, such as the cellular phone number, the carrier supplying service, subscription details, and security information. The SIM card 1149 serves primarily to identify the mobile station 1101 on a radio network. The card 1149 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method for mapping a plurality of underground passageways for drone routing comprising:
   collecting, by at least one sensor, location data for a plurality of entry points, a plurality of exit points, or a combination thereof to the plurality of underground passageways, wherein the plurality of entry points facilitates an entry of a drone into the plurality of underground passageways and the plurality of exit points facilitates an exit of the drone from the plurality of underground passageways,
   storing, by a processor, the location data as one or more data records of a geographic database,
   wherein the at least one sensor, the processor, the geographic database, or a combination thereof is connected to a communication network,
   wherein the geographic database further includes digital map data representing the plurality of underground passageways,
   wherein the geographic database is associated with schedule-data for non-drone traffic,
   wherein the geographic database and the schedule-data for non-drone traffic are used to determine at least a portion of a route through the plurality of underground passageways for the drone, and
   wherein at least the portion of the route is configured to be outputted to the drone to control the drone.

2. The method of claim 1, further comprising:
   determining real-time data regarding an availability of the underground passageways to support travel by the drone; and
   associating the real-time data with a data layer of the geographic database.

3. The method of claim 2, wherein the route is further based on the real-time data.

4. The method of claim 2, wherein the plurality of underground passageways includes an underground sewer, and wherein the real-time data includes sensor data or schedule data indicating a water level in the sewers.

5. The method of claim 2, wherein the real-time data includes weather data that is indicative of a water level in the plurality of underground passageways.

6. The method of claim 1, further comprising:
   determining physical characteristic data of the plurality of entry points, the plurality of exit points, the plurality of underground passageways, wherein the physical characteristic data includes a physical size, a supported drone size, or a combination thereof; and
wherein the physical characteristic data is further stored in the geographic database.

7. The method of claim 1, wherein the drone supports at least one mode of operation, and wherein the at least one mode of operation includes a flying mode, a surface mode, a submersible mode, or a combination thereof.

8. The method of claim 7, further comprising:
determining the at least one mode of operation supported by the plurality of underground passageways,
wherein the determined at least one mode of operation is further associated with the geographic database.

9. The method of claim 1, further comprising:
determining a plurality of waypoints available in the plurality of underground passageways, wherein the drone can wait at the plurality of waypoints while executing the route through the plurality of underground passageways.

10. An apparatus for mapping a plurality of underground passageways for drone routing comprising:
at least one processor; and
at least one memory including computer program code for one or more programs,
the at least one memory and the computer program code configured to, with the at least one processor, cause the apparatus to:
collect, by at least one sensor, real-time data regarding an availability of the underground passageways to support travel by a drone; and
store, by a processor, digital map data representing the plurality of underground passageways as one or more data records of a geographic database,
wherein the at least one processor, the at least one memory, the at least one sensor, the geographic database, or a combination thereof are connected to a communication network,
wherein the geographic database is associated with the real-time data that includes schedule-data for non-drone traffic,
wherein the geographic database and the schedule-data for non-drone traffic are used to determine at least a portion of a route through the plurality of underground passageways for the drone, and
wherein at least the portion of the route is configured to be outputted to the drone to control the drone.

11. The apparatus of claim 10, wherein the apparatus is further caused to:
determine location data for a plurality of entry points, a plurality of exit points, or a combination thereof to the plurality of underground passageways, wherein the plurality of entry points facilitates an entry of a drone into the plurality of underground passageways and the plurality of exit points facilitates an exit of the drone from the plurality of underground passageways; and
store the location data in the geographic database,
wherein the route is further based on the location data.

12. The apparatus of claim 10, wherein the plurality of underground passageways includes an underground sewer, and wherein the real-time data includes sensor data or schedule data indicating a water level in the sewers.

13. The apparatus of claim 10, wherein the real-time data includes weather data that is indicative of a water level in the plurality of underground passageways.

14. A non-transitory computer-readable storage medium for mapping a plurality of underground passageways, interior passageways, or a combination thereof for drone routing, carrying one or more sequences of one or more instructions which, when executed by one or more processors, cause an apparatus to perform:
collecting, by at least one sensor, location data for a plurality of entry points, a plurality of exit points, or a combination thereof to the plurality of the underground passageways, the interior passageways, or the combination thereof wherein the plurality of entry points facilitates an entry of a drone into the plurality of the underground passageways, the interior passageways, or the combination thereof, and the plurality of exit points facilitates an exit of the drone from the plurality of the underground passageways, the interior passageways, or the combination thereof,
storing, by a processor, the location data as one or more data records of a geographic database,
wherein the one or more processors, the at least one sensor, the geographic database, or a combination thereof are connected to a communication network,
wherein the geographic database further includes digital map data representing the plurality of the underground passageways,
wherein the geographic database is associated with real-time data that includes schedule data for non-drone traffic and an availability of the plurality of the underground passageways, the interior passageways, or the combination thereof to support travel by the drone,
wherein the geographic database and the schedule-data for non-drone traffic are used to determine at least a portion of a route through the plurality of the underground passageways for the drone, and
wherein at least the portion of the route is configured to be outputted to the drone to control the drone.

15. The non-transitory computer-readable storage medium of claim 14, wherein the geographic database is used to determine a route through the plurality of underground passageways, the interior passageways, or a combination thereof for the drone.

16. The non-transitory computer-readable storage medium of claim 14, wherein the apparatus is further caused to perform:
determining physical characteristic data of the plurality of entry points, the plurality of exit points, the plurality of the underground passageways, the interior passageways, or the combination thereof,
wherein the physical characteristic data includes a physical size, a supported drone size, or a combination thereof; and
wherein the physical characteristic data is further stored in the geographic database.

17. The non-transitory computer-readable storage medium of claim 14, wherein the drone supports at least one mode of operation, and wherein the at least one mode of operation includes a flying mode, a surface mode, a submersible mode, or a combination thereof; and wherein the apparatus is further caused to perform:
determining the at least one mode of operation supported by the plurality of the underground passageways, the interior passageways, or the combination thereof,
wherein the determined at least one mode of operation is further stored in the geographic database.

18. The non-transitory computer-readable storage medium of claim 14, wherein the apparatus is further caused to perform:
determining a plurality of waypoints available in the plurality of the underground passageways, the interior passageways, or the combination thereof, wherein the drone can wait or pause at the plurality of waypoints while executing the route through the plurality of underground passageways.

* * * * *